United States Patent
Ketola

(10) Patent No.: US 6,598,259 B1
(45) Date of Patent: Jul. 29, 2003

(54) WIND SCREEN WIPER APPARATUS

(76) Inventor: Howard A. Ketola, 9334 Larkspur Ave. 51-C8, Mission BC (CA), V2V 7C9

(*) Notice: Subject to any disclaimer, the term of this patent is extended or adjusted under 35 U.S.C. 154(b) by 167 days.

(21) Appl. No.: 09/904,776

(22) Filed: Jul. 13, 2001

(51) Int. Cl.[7] .............................. B60S 1/06; B60S 1/08
(52) U.S. Cl. ................................. 15/250.3; 15/250.31
(58) Field of Search ......................... 15/250.3, 250.31, 15/250.11, 250.18, 250.1, 250.003

(56) References Cited

U.S. PATENT DOCUMENTS

| | | |
|---|---|---|
| 3,968,537 A | 7/1976 | Wagenhofer |
| 4,066,291 A | 1/1978 | Hickman |
| 4,316,303 A * | 2/1982 | Penn .................... 15/250.3 |
| 4,529,242 A | 7/1985 | Wantanabe et al. |
| D328,275 S | 7/1992 | Nelson et al. |
| 5,274,876 A | 1/1994 | Wehrspann |
| 5,410,774 A * | 5/1995 | Adams .................. 15/250.3 |
| 5,647,086 A * | 7/1997 | Gold ..................... 15/250.31 |
| 5,816,099 A | 10/1998 | Turbessi et al. |
| 6,324,719 B1 * | 12/2001 | Ritacco .................. 15/250.3 |

FOREIGN PATENT DOCUMENTS

| | | | | |
|---|---|---|---|---|
| DE | 2913635 | * | 7/1980 | ............... 15/250.3 |
| FR | 601232 | * | 2/1925 | ............... 15/250.3 |
| FR | 30211 | * | 12/1925 | ............... 15/250.3 |
| GB | 226995 | * | 1/1925 | ............... 15/250.3 |
| IT | 618568 | * | 3/1961 | ............... 15/250.3 |

* cited by examiner

Primary Examiner—Gary K. Graham

(57) ABSTRACT

A wind screen wiper apparatus includes a motor housing that has a perimeter wall for defining an interior space. The motor housing is for coupling to the windscreen of the motorcycle. A motor is positioned within the interior space of the motor housing such that the housing is for protecting the motor from inclement weather. A power supply is operationally coupled to the motor. The power supply provides the motor with power for operating the motor. A wiper assembly is coupled to the motor. The motor actuates the wiper assembly when the power supply provides power to the motor. The wiper assembly is for contacting a surface of the windscreen such that the wiper assembly is for clearing liquid from the windscreen when the power supply provides the motor with power.

14 Claims, 2 Drawing Sheets

WIND SCREEN WIPER APPARATUS

BACKGROUND OF THE INVENTION

1. Field of the Invention

The present invention relates to wiper apparatuses and more particularly pertains to a new wind screen wiper apparatus for allowing a user sweep away moisture from the outside of a transparent panel.

2. Description of the Prior Art

The use of wiper apparatuses is known in the prior art. More specifically, wiper apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,274,876; U.S. Pat. No. 5,816,099; U.S. Pat. No. 4,529,242; U.S. Pat No. 3,968,537; U.S. Pat. No. 4,066,291; and U.S. Pat. No. Des. 328,275.

While these devices fulfill their respective, particular objectives and requirements, the aforementioned patents do not disclose a new wind screen wiper apparatus. The inventive device includes a motor housing that has a perimeter wall for defining an interior space. The motor housing is adapted for coupling to the windscreen of the motorcycle. A motor is positioned within the interior space of the motor housing such that the housing is for protecting the motor from inclement weather. A power supply is operationally coupled to the motor. The power supply provides the motor with power for operating the motor. A wiper assembly is coupled to the motor. The motor actuates the wiper assembly when the power supply provides power to the motor. The wiper assembly is adapted for contacting a surface of the windscreen such that the wiper assembly is adapted for clearing liquid from the windscreen when the power supply provides the motor with power.

In these respects, the wind screen wiper apparatus according to the present invention substantially departs from the conventional concepts and designs of the prior art, and in so doing provides an apparatus primarily developed for the purpose of allowing a user sweep away moisture from the outside of a transparent panel.

SUMMARY OF THE INVENTION

In view of the foregoing disadvantages inherent in the known types of wiper apparatuses now present in the prior art, the present invention provides a new wind screen wiper apparatus construction wherein the same can be utilized for allowing a user sweep away moisture from the outside of a transparent panel.

The general purpose of the present invention, which will be described subsequently in greater detail, is to provide a new wind screen wiper apparatus apparatus and method which has many of the advantages of the wiper apparatuses mentioned heretofore and many novel features that result in a new wind screen wiper apparatus which is not anticipated, rendered obvious, suggested, or even implied by any of the prior art wiper apparatuses, either alone or in any combination thereof.

To attain this, the present invention generally comprises a motor housing that has a perimeter wall for defining an interior space. The motor housing is adapted for coupling to the windscreen of the motorcycle. A motor is positioned within the interior space of the motor housing such that the housing is for protecting the motor from inclement weather. A power supply is operationally coupled to the motor. The power supply provides the motor with power for operating the motor. A wiper assembly is coupled to the motor. The motor actuates the wiper assembly when the power supply provides power to the motor. The wiper assembly is adapted for contacting a surface of the windscreen such that the wiper assembly is adapted for clearing liquid from the windscreen when the power supply provides the motor with power.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wind screen wiper apparatus apparatus and method which has many of the advantages of the wiper apparatuses mentioned heretofore and many novel features that result in a new wind screen wiper apparatus which is not anticipated, rendered obvious, suggested, or even implied by any of the prior art wiper apparatuses, either alone or in any combination thereof.

It is another object of the present invention to provide a new wind screen wiper apparatus, which may be easily and efficiently manufactured and marketed.

It is a further object of the present invention to provide a new wind screen wiper apparatus, which is of a durable and reliable construction.

An even further object of the present invention is to provide a new wind screen wiper apparatus which is susceptible of a low cost of manufacture with regard to both materials and labor, and which accordingly is then susceptible of low prices of sale to the consuming public, thereby making such wind screen wiper apparatus economically available to the buying public.

Still yet another object of the present invention is to provide a new wind screen wiper apparatus, which provides in the apparatuses and methods of the prior art some of the advantages thereof, while simultaneously overcoming some of the disadvantages normally associated therewith.

Still another object of the present invention is to provide a new wind screen wiper apparatus for allowing a user sweep away moisture from the outside of a transparent panel.

Yet another object of the present invention is to provide a new wind screen wiper apparatus, which includes a motor housing that, has a perimeter wall for defining an interior space. The motor housing is adapted for coupling to the windscreen of the motorcycle. A motor is positioned within the interior space of the motor housing such that the housing is for protecting the motor from inclement weather. A power supply is operationally coupled to the motor. The power supply provides the motor with power for operating the motor. A wiper assembly is coupled to the motor. The motor actuates the wiper assembly when the power supply provides power to the motor. The wiper assembly is adapted for contacting a surface of the windscreen such that the wiper assembly is adapted for clearing liquid from the windscreen when the power supply provides the motor with power.

Still yet another object of the present invention is to provide a new wind screen wiper apparatus that would improve the users view to the roadway for allowing motorcyclists to safely travel in poor weather conditions instead of finding another means of transportation.

Even still another object of the present invention is to provide a new wind screen wiper apparatus that would also improve confidence and reduce anxiety when riding in the rain.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
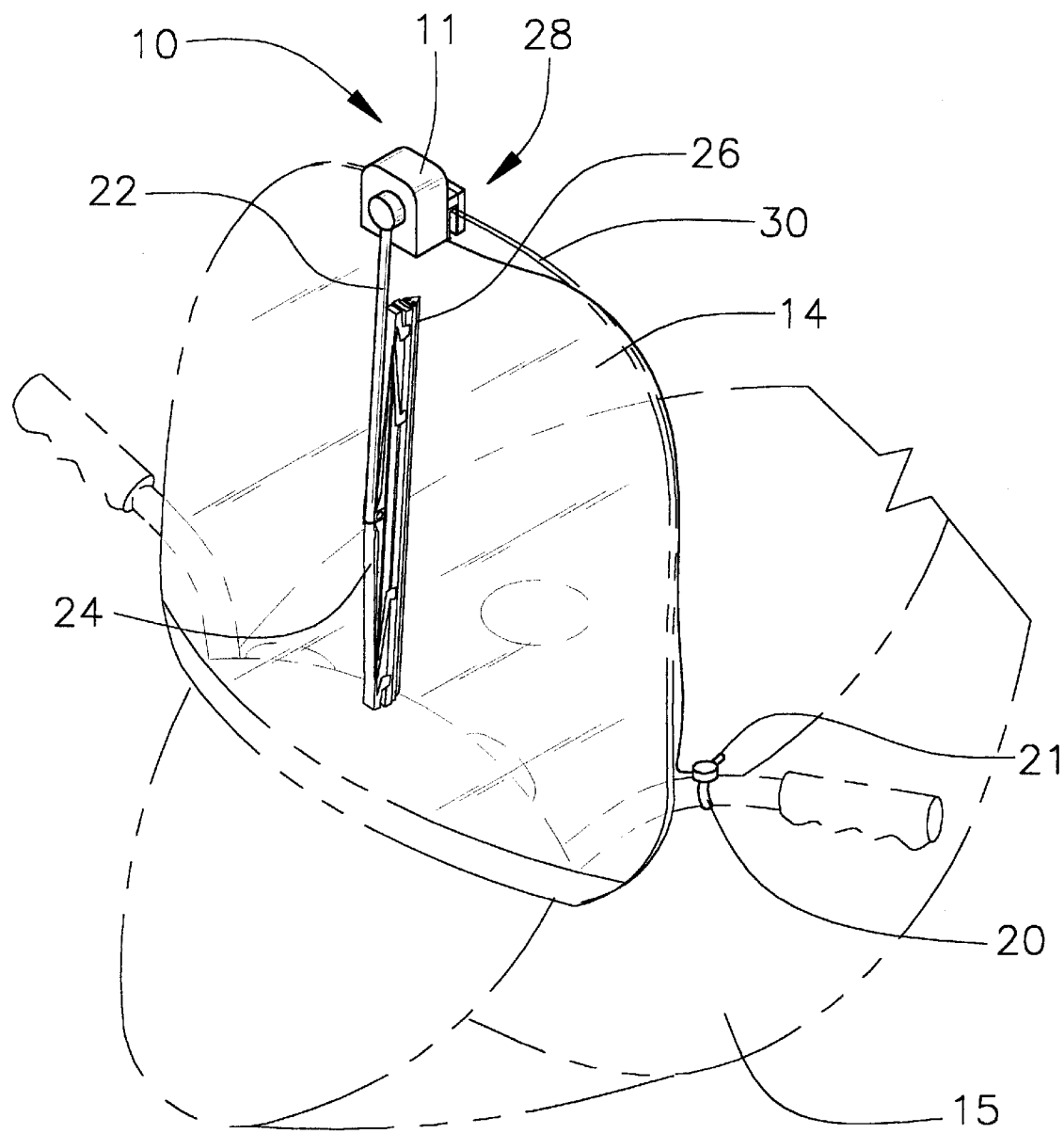
FIG. 1 is a perspective view of a new wind screen wiper apparatus according to the present invention.
Figure 2:
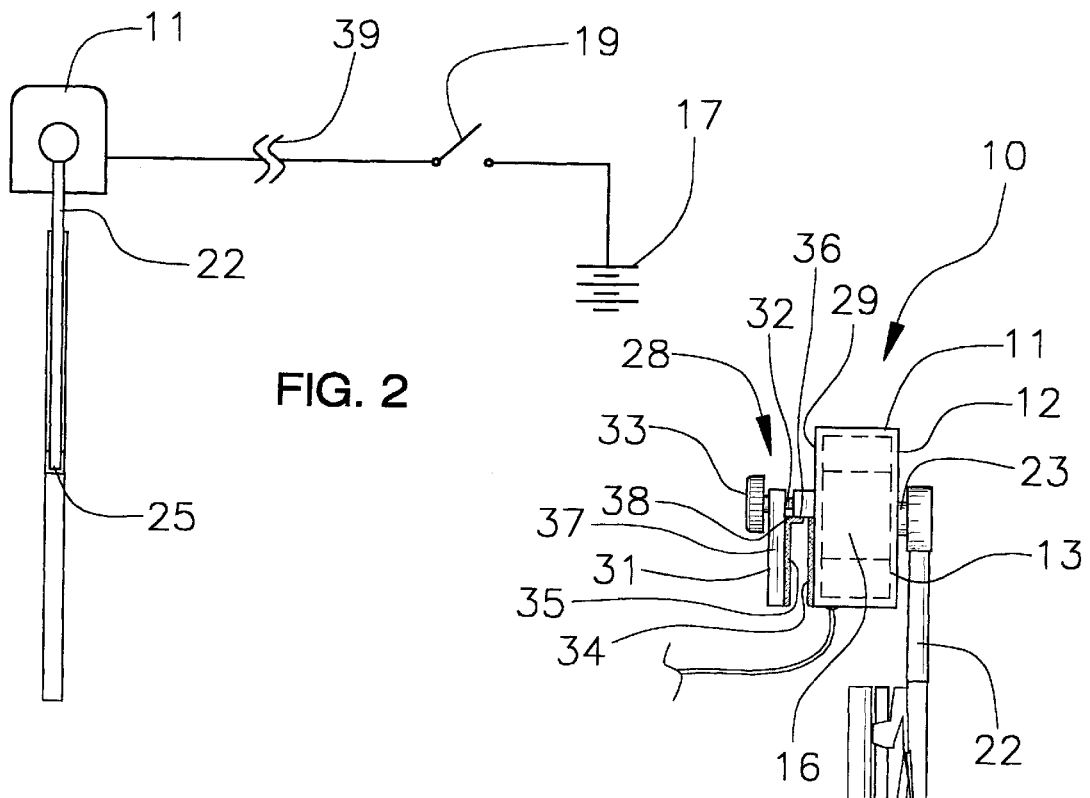
FIG. 2 is a schematic view of the present invention.
Figure 3:
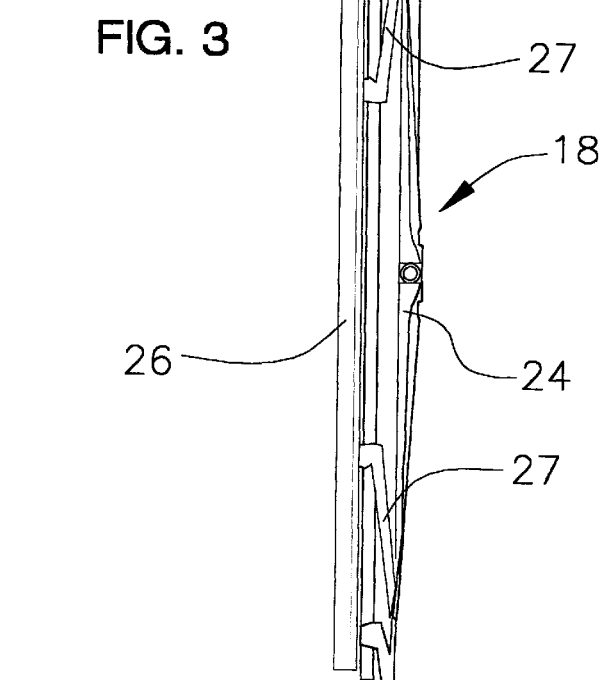
FIG. 3 is a side view of the present invention.

With reference now to the drawings, and in particular to FIGS. 1 through 3 thereof, a new wind screen wiper apparatus embodying the principles and concepts of the present invention and generally designated by the reference numeral 10 will be described.

As best illustrated in FIGS. 1 through 3, the wind screen wiper apparatus 10 generally includes a motor housing 11 that has a perimeter wall 12 for defining an interior space 13. The motor housing 11 is adapted for coupling to the windscreen 14 of the motorcycle 15. A motor 16 is positioned within the interior space 13 of the motor housing 11 such that the housing is for protecting the motor 16 from inclement weather. A power supply 17 is operationally coupled to the motor 16. The power supply 17 provides the motor 16 with power for operating the motor 16. A wiper assembly 18 is coupled to the motor 16. The motor 16 actuates the wiper assembly 18 when the power supply 17 provides power to the motor 16. The wiper assembly 18 is adapted for contacting a surface of the windscreen 14 such that the wiper assembly 18 is adapted for clearing liquid from the windscreen 14 when the power supply 17 provides the motor 16 with power.

A switch 19 is coupled operationally coupled between the motor 16 and the power supply 17. The switch 19 is adapted for being actuated by a user. The switch 19 selectively controls power from the power supply 17 to the motor 16 when the user actuates the switch 19. The switch 19 has a mounting portion 20. The mounting portion 20 of the switch 19 is adapted for coupling to a portion of the motorcycle 15 such that the switch 19 is within reach of the user when the user is mounted on the motorcycle 15. The switch 19 has a lever arm 21. The lever arm 21 protrudes from the mounting portion 20 of the switch 19. The lever arm 21 of the switch 19 is adapted for being actuated by the user such that actuation of the lever arm 21 actuates the switch for controlling power from the power supply 17 to the motor 16.

The wiper assembly 18 has a wiper arm 22. The wiper arm 22 has a end coupled to a shaft 23 of the motor 16. The motor 16 rotates the shaft 23 such that the shaft 23 is for oscillating the wiper arm 22 of the wiper assembly 18 through an arc when the motor 16 is supplied with power from the power supply 17.

The wiper assembly 18 has a frame 24. The frame 24 of the wiper assembly 18 is coupled to a free end 25 of the wiper arm 22. The wiper assembly 18 has a squeegee member 26. The squeegee member 26 is coupled to the frame 24 such that the squeegee member 26 is positioned against the windscreen 14 of the motorcycle 15. The squeegee member 26 is adapted for clearing liquid from the windscreen 14 of the motorcycle 15. The frame 24 of the wiper assembly 18 has a plurality of armatures 27. Each of the armatures 27 are coupled the squeegee member 26. Each of the armatures 27 forces a portion of the squeegee member 26 against the windscreen 14 of the motorcycle 15.

The motor housing 11 has a clamping assembly 28. The clamping assembly 28 is coupled to a rear wall 29 of the perimeter wall 12 of the motor housing 11. The clamping assembly 28 is adapted for selectively securing the housing over a top edge 30 of the windscreen 14.

The clamping assembly 28 of the motor housing 11 has an abutment plate 31. The abutment plate 31 is selectively positionable a distance from the rear wall 29 of the motor housing 11. The clamping assembly 28 is adapted for selectively receiving the windscreen 14 of the motorcycle 15 between the abutment plate 31 of the clamping assembly 28 and the rear wall 29 of the motor housing 11 when the motor housing 11 is to be coupled to the windscreen 14 of the motorcycle 15. The clamping assembly 28 has a threaded rod 32. The threaded rod 32 is threadably coupled to the abutment plate 31 and pivotally coupled to the rear wall 29 of the motor housing 11 such that rotation of the threaded rod 32 selectively adjusts a distance between the abutment plate 31 of the clamping assembly 28 and the rear wall 29 of the motor housing 11.

The clamping assembly 28 has a knob 33. The knob 33 is coupled to the threaded rod 32 opposite the rear wall 29 of the motor housing 11. The knob 33 is adapted for facilitating rotation of the knob 33 by the user when the motor housing 11 is selectively coupled the windscreen 14 of the housing.

The motor housing 11 has a base pad 34. The base pad 34 is coupled to rear wall 29 such that the base pad 34 is aligned with the abutment plate 31 of the clamping assembly 28 thereby positioning the base pad 34 between the rear wall 29 of the motor housing 11 and the windscreen 14 of the motorcycle 15 when the motor housing 11 is selectively coupled to the windscreen 14 of the motorcycle 15. The base pad 34 is adapted for preventing the motor housing 11 from damaging the windscreen 14 of the motorcycle 15 when the motor housing 11 is selectively coupled to the windscreen 14 of the motorcycle 15.

The clamping assembly 28 has an abutment pad 35. The abutment pad 35 is coupled to the abutment plate 31 of the clamping assembly 28 such that the abutment pad 35 is positioned between the abutment plate 31 of the clamping assembly 28 and the windscreen 14 of the motorcycle 15 when the motor housing 11 is selectively coupled to the windscreen 14 of the motorcycle 15. The abutment pad 35 is adapted for preventing the abutment plate 31 of the clamping assembly 28 from damaging the windscreen 14 of the motorcycle 15 when the motor housing 11 is selectively coupled to the windscreen 14 of the motorcycle 15.

The abutment pad 35 has a top portion 36. The top portion 36 outwardly extends from an upper end 38 of a base portion 37 of the abutment pad 35. The top portion 36 of the abutment pad 35 is adapted for protecting the clamping assembly 28 from damaging the top edge 30 of the windscreen 14 of the motorcycle 15 when the motor housing 11 is selectively coupled to the windscreen 14 of the motorcycle 15.

A fuse 39 is operationally coupled between the switch 19 and the motor 16. The fuse 39 is for disrupting power from the power supply 17 to the motor 16 when the motor 16 is loaded beyond a recommended capacity such that the fuse 39 prevents the motor 16 from becoming damaged by continued power when the motor 16 experiences overloaded conditions.

In use, a user would activate the control switch to engage the motor. This would oscillate the rubber wiper blade across the outside of the windshield to remove moisture and maintain full forward visibility for the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windscreen wiper apparatus for wiping liquids from a windscreen of a motorcycle, the windscreen wiper apparatus comprising:

a motor housing having a perimeter wall defining an interior space, said motor housing being adapted for coupling to the windscreen of the motorcycle;

a motor being positioned within said interior space of said motor housing such that said housing is for protecting said motor from inclement weather;

a power supply being operationally coupled to said motor, said power supply providing said motor with power for operating said motor;

a wiper assembly being coupled to said motor, said wiper assembly being actuated by said motor when said power supply provides power to said motor, said wiper assembly being adapted for contacting a surface of the windscreen such that said wiper assembly is adapted for clearing liquid from the windscreen when said power supply provides said motor with power;

said motor housing having a clamping assembly, said clamping assembly being coupled to a rear wall of said perimeter wall of said motor housing, said clamping assembly being adapted for selectively securing said housing over a top edge of the windscreen; and said clamping assembly of said motor housing having an abutment plate, said abutment plate being selectively positionable a distance from said rear wall of said motor housing, said clamping assembly being adapted for selectively receiving the windscreen of the motorcycle between said abutment plate of said clamping assembly and said rear wall of said motor housing when said motor housing is to be coupled to the windscreen of the motorcycle.

2. The windscreen wiper apparatus as set forth in claim 1, further comprising:

a switch being operationally coupled between said motor and said power supply, said switch being adapted for being actuated by a user, said switch selectively controlling power from said power supply to said motor when said switch is actuated by the user.

3. The windscreen wiper apparatus as set forth in claim 2, further comprising:

said switch having a mounting portion, said mounting portion of said switch being adapted for coupling to a portion of the motorcycle such that said switch is within reach of the user when the user is mounted on the motorcycle.

4. The windscreen wiper apparatus as set forth in claim 3, further comprising:

said switch having a lever arm, said lever arm protruding from said mounting portion of said switch, said lever arm of said switch being adapted for being actuated by the user such that actuation of said lever arm actuates said switch for controlling power from said power supply to said motor.

5. The windscreen wiper apparatus as set forth in claim 2, further comprising:

a fuse being operationally coupled between said switch and said motor, said fuse disrupting power from said power supply to said motor when said motor is loaded beyond a recommended capacity such that said fuse prevents said motor from being damaged by continued power when said motor experiences overloaded conditions.

6. The windscreen wiper apparatus as set forth in claim 1, further comprising:

said wiper assembly having a wiper arm, said wiper arm having an end coupled to a shaft of said motor, said motor rotating said shaft such that said shaft is for oscillating said wiper arm of said wiper assembly through an arc when said motor is supplied with power from said power supply.

7. The windscreen wiper apparatus as set forth in claim 6, further comprising:

said wiper assembly having a frame, said frame of said wiper assembly being coupled to a free end of said wiper arm, said wiper assembly having a squeegee member, said squeegee member being coupled to said frame such that said squeegee member is positioned against the windscreen of the motorcycle, said squeegee member being adapted for clearing liquid from the windscreen of the motorcycle.

8. The windscreen wiper apparatus as set forth in claim 7, further comprising:

said frame of said wiper assembly having a plurality of armatures, each of said armatures being coupled to said squeegee member, each of said armatures forcing a portion of said squeegee member against the windscreen of the motorcycle.

9. The windscreen wiper apparatus as set forth in claim 1, further comprising:

said clamping assembly having a threaded rod, said threaded rod being threadably coupled to said abutment plate and pivotally coupled to said rear wall of said motor housing such that rotation of said threaded rod selectively adjusts a distance between said abutment plate of said clamping assembly and said rear wall of said motor housing.

10. The windscreen wiper apparatus as set forth in claim 9, further comprising:

said clamping assembly having a knob, said knob being coupled to said threaded rod opposite said rear wall of said motor housing, said knob being adapted for facilitating rotation of said knob by the user when said motor housing is selectively coupled the windscreen of the housing.

11. The windscreen wiper apparatus as set forth in claim 1, further comprising:

said motor housing having a base pad, said base pad being coupled to rear wall such that said base pad is aligned with said abutment plate of said clamping assembly thereby positioning said base pad between said rear wall of said motor housing and the windscreen of the motorcycle when said motor housing is selectively coupled to the windscreen of the motorcycle, said base pad being adapted for preventing said motor housing from damaging the windscreen of the motorcycle when said motor housing is selectively coupled to the windscreen of the motorcycle.

12. The windscreen wiper apparatus as set forth in claim 1, further comprising:

said clamping assembly having an abutment pad, said abutment pad being coupled to said abutment plate of said clamping assembly such that said abutment pad is positioned between said abutment plate of said clamping assembly and the windscreen of the motorcycle when said motor housing is selectively coupled to the windscreen of the motorcycle, said abutment pad being adapted for preventing said abutment plate of said clamping assembly from damaging the windscreen of the motorcycle when said motor housing is selectively coupled to the windscreen of the motorcycle.

13. The windscreen wiper apparatus as set forth in claim 12, further comprising:

said abutment pad having a top portion, said top portion outwardly extending from an upper end of a base portion of said abutment pad, said top portion of said abutment pad being adapted for protecting said clamping assembly from damaging the top edge of the windscreen of the motorcycle when said motor housing is selectively coupled to the windscreen of the motorcycle.

14. A windscreen wiper apparatus for wiping liquids from a windscreen of a motorcycle, the windscreen wiper apparatus comprising:

a motor housing having a perimeter wall defining an interior space, said motor housing being adapted for coupling to the windscreen of the motorcycle;

a motor being positioned within said interior space of said motor housing such that said housing is for protecting said motor from inclement weather;

a power supply being operationally coupled to said motor, said power supply providing said motor with power for operating said motor; and a wiper assembly being coupled to said motor, said wiper assembly being actuated by said motor when said power supply provides power to said motor, said wiper assembly being adapted for contacting a surface of the windscreen such that said wiper assembly is adapted for clearing liquid from the windscreen when said power supply provides said motor with power;

wherein a switch being operationally coupled between said motor and said power supply, said switch being adapted for being actuated by a user, said switch selectively controlling power from said power supply to said motor when said switch is actuated by the user;

wherein said switch having a mounting portion, said mounting portion of said switch being adapted for coupling to a portion of the motorcycle such that said switch is within reach of the user when the user is mounted on the motorcycle;

wherein said switch having a lever arm, said lever arm protruding from said mounting portion of said switch, said lever arm of said switch being adapted for being actuated by the user such that actuation of said lever arm actuates said switch for controlling power from said power supply to said motor;

wherein said wiper assembly having a wiper arm, said wiper arm having an end coupled to a shaft of said motor, said motor rotating said shaft such that said shaft is for oscillating said wiper arm of said wiper assembly through an arc when said motor is supplied with power from said power supply;

wherein said wiper assembly having a frame, said frame of said wiper assembly being coupled to a free end of said wiper arm, said wiper assembly having a squeegee member, said squeegee member being coupled to said frame such that said squeegee member is positioned against the windscreen of the motorcycle, said squeegee member being adapted for clearing liquid from the windscreen of the motorcycle;

wherein said frame of said wiper assembly having a plurality of armatures, each of said armatures being coupled to said squeegee member, each of said armatures forcing a portion of said squeegee member against the windscreen of the motorcycle;

wherein said motor housing having a clamping assembly, said clamping assembly being coupled to a rear wall of said perimeter wall of said motor housing, said clamping assembly being adapted for selectively securing said housing over a top edge of the windscreen;

wherein said clamping assembly of said motor housing having an abutment plate, said abutment plate being selectively positionable a distance from said rear wall of said motor housing, said clamping assembly being adapted for selectively receiving the windscreen of the motorcycle between said abutment plate of said clamping assembly and said rear wall of said motor housing when said motor housing is to be coupled to the windscreen of the motorcycle;

wherein said clamping assembly having a threaded rod, said threaded rod being threadably coupled to said abutment plate and pivotally coupled to said rear wall of said motor housing such that rotation of said threaded rod selectively adjusts a distance between said abutment plate of said clamping assembly and said rear wall of said motor housing;

wherein said clamping assembly having a knob, said knob being coupled to said threaded rod opposite said rear wall of said motor housing, said knob being adapted for facilitating rotation of said knob by the user when said motor housing is selectively coupled the windscreen of the housing;

wherein said motor housing having a base pad, said base pad being coupled to rear wall such that said base pad is aligned with said abutment plate of said clamping assembly thereby positioning said base pad between said rear wall of said motor housing and the windscreen of the motorcycle when said motor housing is selectively coupled to the windscreen of the motorcycle, said base pad being adapted for preventing said motor housing from damaging the windscreen of the motorcycle when said motor housing is selectively coupled to the windscreen of the motorcycle;

wherein said clamping assembly having an abutment pad, said abutment pad being coupled to said abutment plate of said clamping assembly such that said abutment pad is positioned between said abutment plate of said clamping assembly and the windscreen of the motorcycle when said motor housing is selectively coupled to the windscreen of the motorcycle, said abutment pad being adapted for preventing said abutment plate of said clamping assembly from damaging the windscreen of the motorcycle when said motor housing is selectively coupled to the windscreen of the motorcycle;

wherein said abutment pad having a top portion, said top portion outwardly extending from an upper end of a base portion of said abutment pad, said top portion of said abutment pad being adapted for protecting said clamping assembly from damaging the top edge of the windscreen of the motorcycle when said motor housing is selectively coupled to the windscreen of the motorcycle;

wherein a fuse being operationally coupled between said switch and said motor, said fuse disrupting power from said power supply to said motor when said motor is loaded beyond a recommended capacity such that said fuse prevents said motor from being damaged by continued power when said motor experiences overloaded conditions.

* * * * *